April 11, 1939.   E. LAWRENCE   2,154,339
OIL EXTRACTOR
Filed Sept. 7, 1935
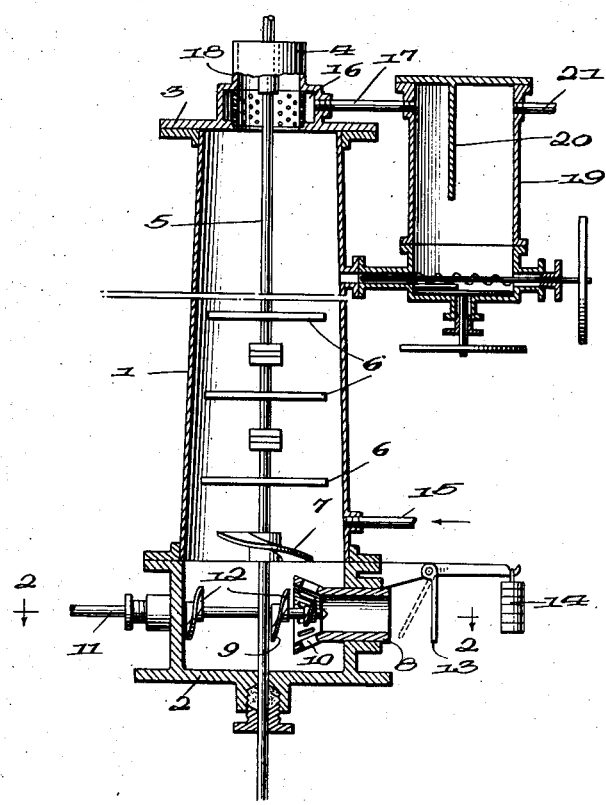
Fig. 1.
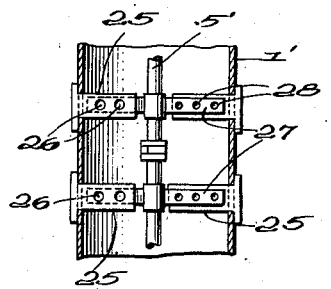
Fig. 3.
Fig. 4.
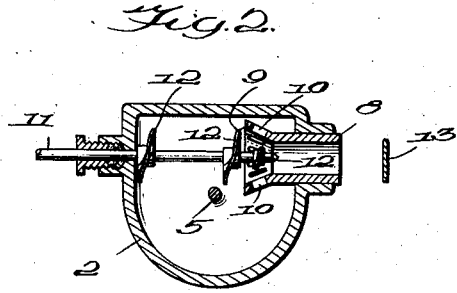
Fig. 2.
Inventor
Edwin Lawrence
By Cyrus Kehr
Attorney Patented Apr. 11, 1939

2,154,339

UNITED STATES PATENT OFFICE 2,154,339

OIL EXTRACTOR

Edwin Lawrence, Cossipore, Calcutta, India

Application September 7, 1935, Serial No. 39,647

12 Claims. (Cl. 87—6)

This invention relates to an improvement in oil extractors, particularly for the extraction of oil from oleaginous material, such for instance as soy beans, cotton seed, and the like, particularly when such material is ground or comminuted as in the form of meal. This application is an improvement on my invention as set forth in my prior U. S. Patent, No. 1,748,356, granted February 25, 1930, on an Apparatus and method of extracting oil from oleaginous material.

My invention makes use of the counter-current action of the material and solvent by which the material loses its oil and the solvent gains the oil, while near the discharge of the apparatus perfectly clean material meets clean solvent, so that the amount of solvent injected into the extractor, as small as it is for this system, need only exceed the amount of solvent which leaves with the discharged meal by a very small amount. Thus a great saving is effected in the solvent required which likewise greatly reduces the amount of solvent which it is necessary to have in storage, as for instance fifty gallons of solvent against several thousand gallons required heretofore, thereby greatly lessening the danger in the storage of the solvent.

The counter-current method of extraction greatly reduces the plant in its entirety and more particularly the elimination of large pipes, heaters, deodorizers, condensers, and water solvent separators, inasmuch as all of these are greatly reduced by my invention, and yet better results are obtained and a fairly dry meal discharged from the extrator. The whole plant can be made so compact that it will be suitable for an industrialized barn, so that a few soy bean farmers for instance can cooperate and send their extracted oil to a central refinery and each retain the meal for feed of his own cattle or larger units may be constructed for larger mills with corresponding economy. Small units may even be installed in a portable manner so as to be transported from farm to farm.

One of the objects of this invention is to give an increased load to the material in the extractor, reducing surface friction between the material and the walls of the extractor for the purpose of squeezing out excess solvent from the material in order to obtain a more consolidated discharge. This object is obtained in my present invention by the use of tapering walls of the shell of the extractor, making it approximately frusto-conical, with the discharge at the larger end.

A further object of the invention is to increase the compressing action at the discharge of the extractor and to accommodate a larger screw with a better squeezing action on the material, which object is accomplished by re-designing the discharge of the extractor and by the use of a conical discharge mouth which also permits the use of elongated slots therein obtaining a more complete extraction of the solvent from the material pressed into the conical mouth.

A further object of the invention is to produce an interchange of solvent in the flakes of material as they descend in the counter-current extractor, similar to the action of a sponge when squeezed, which object is obtained by squeezing the material during its descent in the extractor, thereby obtaining greater penetration of the flakes of material by the solvent and thereafter a complete extraction of the solvent and oil from the flakes which obtains a more complete extraction of the oil from the material as it descends in the extractor. Arms may be mounted on the shaft of the extractor for oscillation in cooperation with stationary arms fixed to the walls of the extractor for squeezing out and compressing the material.

I have shown a preferred embodiment of my invention together with a modification thereof, in the accompanying drawing, in which:

Fig. 1 is a vertical sectional view, partly in elevation, through the extractor;

Fig. 2 is a horizontal sectional view therethrough on the line 2—2, of Fig. 1;

Fig. 3 is a detail vertical sectional view partly in elevation through a modified form of extractor; and Fig. 4 is a horizontal sectional view therethrough.

I have shown only the extractor in the accompanying drawing, inasmuch as it embodies my present improvements over my patent No. 1,748,356, and reference may be had to my patent for the remainder of the apparatus which would be useful and suitable in connection with my improved extractor.

As shown in the drawing, particularly Figs. 1 and 2 thereof, my extractor comprises a tapered tubular or frusto-conical shell 1, supported upon a base 2, at the bottom and covered at the top by a head 3, having a central inlet 4 through which the material is introduced.

A shaft 5 is journaled in suitable supporting and thrust bearings (not shown), and extends longitudinally through the shell 1 of the extractor, carrying radial stir arms 6, on an intermediate portion thereof for the purpose of stirring up the material during its descent in the extractor. The shaft 5 also carries a spiral blade 7 thereon in the lower portion of the shell 1, of the extractor for causing downward pressure upon the material in the extractor, forcing it into the base 2, for discharge.

The base 2 has a discharge tube 8, in one side thereof, terminating at its inner end in a conical mouth 9, which is provided with elongated slots 10. A shaft 11 is journaled in one side of the base 2 and extends transversely thereof into the tube 8, as shown in Figs. 1 and 2. Segmental screw blades 12 are mounted on the shaft 11, the blades in and adjacent to the conical mouth 9, being of gradually diminishing radius, in order to feed and compress the material into the tube 8, and its conical mouth 9, and at the same time to squeeze out a substantial portion of the solvent therefrom through the slots 10.

A gate valve 13 is supported at one side of the base 2, in front of the tube 8, and has weights 14 connected therewith normally tending to press the same toward the end of the tube 8, in order to facilitate the breaking up of the material, as it is discharged from the tube.

The solvent is introduced into the lower portion of the extractor, as for instance, through the pipe 15, although this pipe may be connected with the base below the conical mouth 9, as shown in my former patent, if this should be desired.

The solvent and oil are discharged at the upper end of the extractor, as for instance, at one side of the inlet 4, which is provided with a circumferential channel 16 therein, connected with a discharge pipe 17. A foraminous screen 18 covers the inner side of the channel 16, and the material introduced into the extractor passes through the screen 18, so that the oil and solvent are filtered through the incoming material.

The discharge pipe 17 is connected with a settling chamber 19, having a partition 20 therein, so as to direct the incoming oil and solvent downwardly to the lower portion of the chamber 19, around the lower edge of the partition 20 and up on the other side, where it is discharged through the pipe 21. The lower portion of the chamber 19 has a screw 22 for the purpose of returning any material settling to the bottom of the chamber to the interior of the extractor.

The operation of the extractor will be obvious from the above taken in connection with my prior patent, No. 1,748,356. The material is introduced through the inlet 4, where it falls by gravity through the upper portion of the shell 1 of the extractor, it being understood that the extractor will be maintained substantially full, so that additional material will be admitted only as material is discharged at the bottom. Clean solvent is introduced at the bottom of the extractor through the pipe 15 and passes upward through the material therein, extracting the oil from the material and being discharged through the screen 18 and pipe 17 into the chamber 19, as described above.

The material in the lower portion of the extractor will be forced downwardly into the base 2, by the screw blade 7, and it will be compressed into the conical mouth 9, by the screw blades 12, which squeeze out surplus solvent through the slots 10 and discharge the material from the tube 8, substantially clean and dry. The material is thereafter heated, deodorized, etc., substantially as set forth in my above-mentioned patent.

The material will be compressed in the extractor, first, by gravity in the upper portion thereof, second, by the screw blade 7, third, by the screw blades 12, and fourth by the discharge mouth 9, which effectively removes the solvent from the material permitting it to be discharged in a fairly dry condition, and at the same time taking out substantially all of the oil.

In the modification shown in Figs. 3 and 4, the shell of the extractor, designated 1', is provided with inwardly extending fixed arms 25, having perforations 26 therein, and mounted on the shaft 5' are movable arms 27, which are also perforated as at 28. The shaft 5' is oscillated as by means of a spring connected driving pitman, so as to squeeze the material descending in the extractor between the fixed and movable arms 25 and 27, thereby producing an interchange of solvent and oil in the flakes of material as it descends in the counter-current extractor. The expressed solvent and oil escapes both vertically and through the perforations 26 and 28, and serves to wash off any material caked on the arms from squeezing. In this way, a more complete extraction of oil is obtained by reason of the squeezing of the material causing it first to absorb the solvent and thereafter to discharge the solvent and oil.

The shell 1' of the extractor may be either cylindrical or tapering; the tapering shell facilitates the downward pressure of the superimposed material and eliminates surface friction between the material and shell, also eliminating bridging over of the material in the extractor.

I claim:

1. In an oil extraction apparatus for finely divided material, an upright extractor chamber shell having tapering sides with the larger end downward and having a lateral discharge mouth at said lower end, said mouth having side openings therein within the shell, and a horizontal screw arranged transversely of said lower end in position to force the material through said discharge mouth.

2. In an oil extraction apparatus for finely divided material, an upright extractor chamber having a perforated conical lateral discharge mouth at one side of the lower portion of said chamber for discharging the material therein, and means for forcing the material into the enlarged end of said discharge mouth, the perforated portion of the discharge mouth being in open communication with the extractor chamber.

3. In an oil extraction apparatus for finely divided material, an upright extractor chamber having a conical discharge mouth at one side of the lower portion of said chamber for discharging the material therein, and means for forcing the material into the enlarged end of said discharge mouth, said conical discharge mouth having openings in the sides thereof within the chamber for squeezing fluid from the material forced thereinto.

4. In an oil extraction apparatus for finely divided material, an upright extractor chamber having a conical discharge mouth at one side of the lower portion of said chamber for discharging the material therein, and means for forcing the material into the enlarged end of said discharge mouth, said conical discharge mouth having elongated slots extending longitudinally in the sides thereof for squeezing fluid from the material forced into said mouth.

5. In an oil extraction apparatus for finely divided material, a nupright cylindrical extractor chamber having a laterally arranged conical discharge mouth at one side of the lower end thereof, said conical discharge mouth having straining openings in the sides thereof within said chamber, and means for forcing the material from the chamber into said mouth.

6. In an oil extraction apparatus for finely divided material, an upright cylindrical extractor chamber having a laterally arranged conical discharge mouth at one side of the lower end thereof, and means for forcing the material from the chamber into said mouth, said conical mouth having openings in the sides thereof in the chamber for squeezing fluid from the material forced into the mouth.

7. In an oil extraction apparatus for finely divided material, an upright cylindrical extractor having a laterally arranged conical discharge mouth at one side of the lower end thereof, a screw extending transversely of the lower end of the chamber in alignment with said mouth for forcing material from the chamber thereinto, said mouth having orifices in the sides thereof within the confines of the chamber for squeezing fluid from the material forced into the mouth.

8. In an oil extraction apparatus for finely divided material, an upright extractor chamber, a discharge tube in a side of said extractor chamber, said tube having a conical perforated mouth at the inner end thereof arranged in said extractor chamber, and a screw extending transversely of said chamber into said mouth for forcing material from the chamber thereinto to squeeze juice from the material through the perforations of the mouth.

9. In an oil extractor apparatus of the character described, an extractor shell having a chamber therein, fixed arms secured to said shell and projecting into said chamber, a support carrying movable arms in horizontal alignment with said fixed arms, and means for oscillating said movable arms toward and from the fixed arms for squeezing material therebetween.

10. In an oil extraction apparatus of the character described, an extractor shell having a chamber therein, fixed arms secured to said shell and projecting into said chamber, a support carrying movable arms in horizontal alignment with said fixed arms, and means for oscillating said movable arms toward and from the fixed arms for squeezing material therebetween, said fixed and movable arms having lateral perforations therethrough for removal of juice from the squeezed material.

11. In an oil extraction apparatus of the character described, an extractor shell having a chamber therein, fixed arms secured to said shell and projecting into said chamber, a shaft journaled in said chamber and carrying movable arms in horizontal alignment with the fixed arms, at least one set of said arms being perforated, and means for oscillating said shaft for moving the movable arms alternately toward and from the fixed arms for squeezing material therebetween.

12. In an oil extraction apparatus of the character described, an extractor shell having a chamber therein, fixed arms secured to said shell and projecting into said chamber, a shaft journaled in said chamber and carrying movable arms in horizontal alignment with the fixed arms, and means for oscillating said shaft for moving the movable arms alternately toward and from the fixed arms for squeezing material therebetween, said fixed and movable arms having lateral perforations therethrough for removal of juice from the squeezed material.

EDWIN LAWRENCE.